UNITED STATES PATENT OFFICE.

JOHN L. MITCHELL, OF GREENWICH, CONNECTICUT.

MANUFACTURE OF LITHOPONE.

1,356,387. Specification of Letters Patent. Patented Oct. 19, 1920.

No Drawing. Application filed August 20, 1918. Serial No. 250,708.

*To all whom it may concern:*

Be it known that I, JOHN L. MITCHELL, a citizen of the United States, and a resident of Greenwich, in the county of Fairfield and State of Connecticut, have invented new and useful Improvements in the Manufacture of Lithopone, of which the following is a full, clear, and exact description.

The object of the invention is to provide certain new and useful improvements in the manufacture of lithopone whereby a thorough calcination of the product takes place and the desired density and opacity is obtained with a corresponding increase in the quality of the lithopone.

In order to produce the desired result a precipitate formed of barium sulfate and zinc sulfid is pulverized and then subjected simultaneously to heat and agitation in a muffle furnace to calcine the product, then quenching the latter in cold water and finally drying it. Heretofore lithopone was produced as a precipitation from a solution of barium sulfid and zinc sulfate, the precipitate being barium sulfate and zinc sulfid. This product was subsequently washed, dried and calcined in a muffle furnace at a temperature of from 500° to 700° C., and then the product was quenched in cold water, dried and ground in a pulverizing mill to form a marketable lithopone. Lithopone made in the manner described is not thoroughly calcined owing to the lumpy condition of the material which prevents the heat from permeating the entire mass and owing to this imperfect calcination loss of density and opacity is the result.

In my process the precipitate formed of barium sulfate and zinc sulfid is dried and then thoroughly pulverized by grinding or other means and is then placed in an airtight muffle and calcined at a temperature of from 700° to 950° C. During this calcination the pigment is constantly stirred by raking or otherwise agitating the same to allow the heat to permeate the whole mass thus insuring a thorough calcination. After the calcination operation is completed the product is quenched in cold water and made ready for the market in the usual manner. Lithopone produced in the manner described is of the desired density and opacity with a corresponding increase in the quality.

Having thus described my invention, I claim as new and desire to secure by Letters Patent:—

1. The herein described process for manufacturing lithopone which consists in washing and drying a product formed of barium sulfate and zinc sulfid, then pulverizing this product, then subjecting it simultaneously to heat and agitation in a muffle furnace to calcine the product, then quenching it in cold water and finally drying it.

2. In the preparation of lithopone, the steps of first drying a wet precipitate of barium sulfate and zinc sulfid, then pulverizing the resultant product and calcining it while agitating it.

3. In the preparation of lithopone, the steps of first drying a wet precipitate of barium sulfate and zinc sulfid, then pulverizing the resultant product and calcining it at a temperature of 700° to 950° C. while agitating it.

JOHN L. MITCHELL.